United States Patent
Arora

(10) Patent No.: US 11,115,338 B2
(45) Date of Patent: Sep. 7, 2021

(54) INTELLIGENT CONVERSION OF INTERNET DOMAIN NAMES TO VECTOR EMBEDDINGS

(71) Applicant: Hughes Network Systems, LLC, Germantown, MD (US)

(72) Inventor: Amit Arora, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/709,816

(22) Filed: Dec. 10, 2019

(65) Prior Publication Data
US 2021/0176181 A1   Jun. 10, 2021

(51) Int. Cl.
| H04L 12/851 | (2013.01) |
| G06N 3/08 | (2006.01) |
| H04L 12/803 | (2013.01) |
| H04L 29/12 | (2006.01) |
| G06N 3/04 | (2006.01) |

(52) U.S. Cl.
CPC .......... *H04L 47/2441* (2013.01); *G06N 3/04* (2013.01); *G06N 3/08* (2013.01); *H04L 47/125* (2013.01); *H04L 61/1511* (2013.01)

(58) Field of Classification Search
CPC .......... G06N 3/04; G06N 3/08; H04L 47/125; H04L 47/2441; H04L 61/1511
See application file for complete search history.

(56) References Cited

U.S. PATENT DOCUMENTS

| 8,005,782 | B2* | 8/2011 | Reznik | G06F 16/95 706/52 |
| 8,260,914 | B1* | 9/2012 | Ranjan | H04L 61/1511 709/224 |
| 9,787,642 | B2* | 10/2017 | Yu | H04L 61/1511 |
| 10,250,465 | B2 | 4/2019 | Baldi et al. | |
| 2013/0044599 | A1* | 2/2013 | Cherian | H04L 47/2433 370/235 |
| 2016/0065534 | A1* | 3/2016 | Liu | H04L 61/1511 707/728 |
| 2016/0099961 | A1* | 4/2016 | Paugh | G06F 16/90335 726/23 |
| 2020/0106790 | A1* | 4/2020 | Bagnall | H04L 43/08 |

(Continued)

OTHER PUBLICATIONS

Waldemar Lopez et al; Vector representation of Internet Domain Names using a Word Embedding technique; 2017 XLIII Latin American Computer Conference (CLEI); 2017, pp. 1-8; Cordoba—English Abstract.

(Continued)

*Primary Examiner* — Thomas J Dailey
(74) *Attorney, Agent, or Firm* — NovoTechIP International PLLC

(57) ABSTRACT

A method of and system for converting domain names to a vector space embedding may include receiving data relating to internet traffic over a network, organizing the data into one or more documents that make up a training dataset, each of the one or more documents including one or more Domain Name Server (DNS) queries, providing the training dataset to a deep neural network to generate at least one vector space embedding for one or more domain names, and providing the vector space embedding as an output.

20 Claims, 12 Drawing Sheets

(56) References Cited

U.S. PATENT DOCUMENTS

2020/0112574 A1* 4/2020 Koral .................. H04L 61/1511

OTHER PUBLICATIONS

Hugo Caselles-Dupre et al; Word2vec applied to Recommendation: Hyperparameters Matter; 2018; arXiv:1804.04212v3 [cs.IR].
Quoc V. Le et al; Distributed representations of sentences and documents; 2014; CoRR, vol. abs/1405.4053.
Ben Eisner et al; Learning emoji representations from their description; 2016; CoRR, ol. abs/1609.08359.
Tomas Mikolov et al; Efficient estimation of word representations in vector space; 2013; CoRR, vol. abs/1301.3781.
Ledell Wu et al; StarSpace: Embed All the Things!; 2017; arXiv:1709.03856 [cs.CL].
International Search Report and Written Opinion dated Mar. 25, 2021 in corresponding PCT/US2020/064171.

* cited by examiner

200 ⟶

```
Oct 22, 2018 02:29:38.680373000 202.95.128.180 10.128.17.185  config-api.internet.apps.samsung.com      0x0001
Oct 22, 2018 02:29:38.761780000 202.182.182.182 10.128.146.105 googleads.g.doubleclick.net             0x001c
Oct 22, 2018 02:29:38.768370000 202.95.128.180 10.128.17.185  config-api.internet.apps.samsung.com      0x001c
Oct 22, 2018 02:29:38.970772000 202.95.128.180 10.128.17.185  api.foursquare.com                        0x001c
Oct 22, 2018 02:29:39.053499000 8.8.8.8 10.128.19.124  c.disquscdn.com                                  0x0001
```

Raw Data

350 ↘

```
TS1, IP1, DN1, DN2, DN3, DN4, DN5
TS1, IP2, DN6, DN7, DN8, DN9
```

Data For DNS Vectors

FIG. 3

| Domain name | TF-IDF |
|---|---|
| sling.com | 2.908654 |
| anpling.com | 2.792486 |
| akadns.net | 2.726355 |
| amazon.com | 2.708085 |
| microsoft.com | 2.611340 |
| icloud.com | 2.501757 |
| facebook.com | 2.372640 |
| googleapis.com | 2.158018 |
| google.com | 1.893000 |
| apple.com | 1.877232 |

INTELLIGENT CONVERSION OF INTERNET DOMAIN NAMES TO VECTOR EMBEDDINGS

TECHNICAL FIELD

This disclosure relates generally to domain name classification, and more particularly, to a method and system of intelligently clustering Internet Domain names by using vector embeddings.

BACKGROUND

Internet traffic classification is an important task for Internet Service Providers (ISPs) in determining how to treat incoming traffic. For example, internet traffic classification can be used in prioritizing, shaping, and content filtering of internet traffic. These traffic engineering operations often result in more efficient internet services. However, classification is often difficult to achieve because of the increase in use of encrypted internet protocols such as Hypertext Transfer Protocol Secure (HTTPS). Current internet traffic classification solutions often focus on finding similar domains. While this may be useful, its accuracy is very limited.

Hence, there is a need for an improved method and system of intelligently classifying internet traffic.

SUMMARY

To address these issues and more, in one general aspect, the instant application describes a data processing system having a processor and a memory in communication with the processor where the memory stores executable instructions that, when executed by the processor, cause the data processing system to perform multiple functions. The functions may include may include receiving data relating to internet traffic over a network, organizing the data into one or more documents that make up a training dataset, each of the one or more documents including one or more Domain Name Server (DNS) queries, using the training dataset to generate at least one vector space embedding for one or more domain names, and providing the vector space embedding as an output.

In yet another general aspect, the instant application describes a method for converting domain names to a vector space embedding. The method may include receiving data relating to internet traffic over a network, organizing the data into one or more documents that make up a training dataset, each of the one or more documents including one or more Domain Name Server (DNS) queries, using the training dataset to generate at least one vector space embedding for one or more domain names, and providing the vector space embedding as an output.

In a further general aspect, the instant application describes a non-transitory computer readable medium on which are stored instructions that when executed cause a programmable device to receive data relating to internet traffic over a network, organize the data into one or more documents that make up a training dataset, each of the one or more documents including one or more Domain Name Server (DNS) queries, use the training dataset to generate at least one vector space embedding for one or more domain names, and provide the vector space embedding as an output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 2 depicts an example data file containing information about domain name server traffic data collected from an internet service provider.

FIG. 3 depicts an example data file containing raw domain query data and a dataset created from that data file for use in generating domain name server vectors.

FIG. 4 depicts an example list of domain names with their corresponding TF-IDF scores.

DETAILED DESCRIPTION

Figure 1:
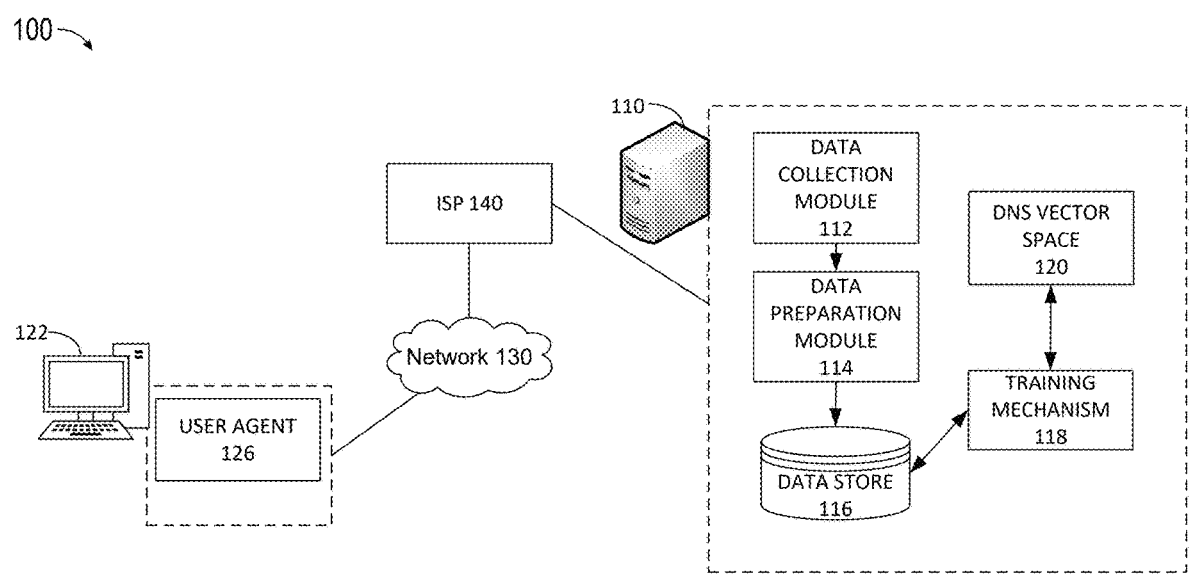
FIG. 1 depicts an example system architecture upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

In recent years, as ISPs deal with increased internet traffic demands, correctly classifying internet traffic has become more and more important. This is particularly true since correct classification of internet traffic can be used in several different traffic engineering operations that help increase efficiency and reduce costs. However, classifying internet traffic can be challenging because of prevalent use of encrypted protocols. When internet traffic comes from sources that use encrypted protocols, it may not be possible to determine content length or other indicators in the header. As a result, it is often difficult to estimate the duration of a connection. However, because encrypted protocols still contain the destination address in terms of a domain name and/or internet protocol (IP) address, classifying the domain name can help in estimating the duration of the connection, among other things. As a result, some domain name classification solutions have been developed in recent years. However, currently available classification solutions often focus on finding directly similar internet domains. While direct similarity mechanisms may be useful in identifying some similar internet domains, they can easily fail. For example, a direct similarity mechanism may determine that websites having an "api" string refer to servers hosting an application programming interface (API). As a result, the direct similarity mechanism may indicate that any website having an "api" string should be treated as a high priority short live transaction. However, if a website decides to use a different type of string for an API server, the direct similarity mechanism may not be able to easily identify that. As such, currently available solutions may not be effective in improving internet traffic.

To address these technical problems and more, in an example, this description provides a technical solution for intelligently classifying internet traffic. To improve the current methods of classifying internet traffic, the technical solution may utilize a training mechanism that collects internet traffic information from one or more users over a specified time period, combines the data into a single file, and removes unnecessary data from the file. The data in the file may then be sorted based on timestamps and source IP address to identify the destination IP addresses that are accessed by a source IP address within a specified time period. This information may be treated as a document, while each destination address within the document is treated as a word. To ensure frequently used domain names do not eschew the deep neural network used to train the model, the most frequently used domain names may be removed from the documents. The resulting data in the file is then fed to a deep neural network to train a machine learning (ML) model that coverts the domain names to vector embeddings where the vectors are classified based on, among other things, the relationship between domain names. The resulting trained model may then be used in a host of traffic engineering solutions. For example, internet traffic classification can assist in shaping, content filtering, prioritization, predicting browsing sequence and anomaly detection. As a result, the technical solution provides an improved system and method of classifying internet traffic that can assist in optimizing internet traffic. This promotes efficiency, accuracy, and an improved user experience.

As will be understood by persons of skill in the art upon reading this disclosure, benefits and advantages provided by such technical solutions can include, but are not limited to, a solution to the technical problem of correctly classifying internet traffic. Technical solutions and implementations provided here optimize and improve the process of classifying internet traffic via immersive environments and other systems. The benefits provided by these solutions include providing a traffic classification system that can classify internet domain names in a way that is highly useful for traffic engineering applications. Furthermore, these solutions can provide a system that can continually learn as traffic patterns and parameters change. This may result in traffic engineering operations that improve user experience, increase efficiency and reduce cost.

As a general matter, the methods and systems described herein may include, or otherwise make use of, a machine-trained model to provide various functions. Machine learning generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in internet traffic and determine associations between various domain names. Such determination may be made following the accumulation, review, and/or analysis of input data from a large number of users and/or systems over time. The data may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of contents and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks and deep neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates an example system architecture 100, upon which aspects of this disclosure may be implemented. The system 100 may include a server 110 which may be connected to or include a data store 116 in which data relating to domain names which can be used in training a ML model may be stored. The data store 116 may function as a repository in which documents and/or data sets relating to training models for converting domain names to a DNS vector space may be stored.

The training mechanism 118 may use training datasets stored in the data store 116 to provide initial and ongoing training for each of the model(s). In one implementation, the training mechanism 118 may use training data from the data store 116 to train each of the model(s) via ML models such as deep neural networks. The initial training may be performed in an offline stage.

The server 110 may receive the data for the training data set from an ISP 140 which provides internet service to one or more client device(s) 120. The data may include domain name queries received from the client device 120. This data may be provided by the ISP 140 to one or more elements of the server 110 to prepare a dataset for training the ML models. In one implementation, the data may be provided to a data collection module 112 which may collect and store the relevant data over a predetermined period of time.

The data collection module 112 may then supply this data (e.g., after the collection period has ended) to a data preparation module 114. The data preparation module 114 may remove unnecessary information from the data while it may merge some of the other data. The data preparation module 114 may also sort and organize the data in a format that may be useful for training a ML model. The resulting data may be provided to the data store 116 to be stored as a training dataset.

The client device 120 may be connected to the ISP 140 via a network 130 (which may be provided by and part of the ISP 140). The network 130 may be a wired or wireless network(s) or a combination of wired and wireless networks that connect one or more elements of the system 100. Moreover, although shown as one network, network 130 may represent a plurality of networks used to connect various elements of the system 100.

The client device 120 may be a personal or handheld computing device having or being connected to input/output elements that enable a user to interact with a user agent 126 on the client device 120 to access the internet. Examples of suitable client devices 120 include but are not limited to personal computers, servers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 11 and 12. It should be noted although only one client device 120 is shown, the system 100 may include numerous such client devices.

The server 110 may provide a training mechanism 118 that converts the data in the data store 116 to a semantic vector space such as the DNS vector space 120. This may involve representing the domain names as word embeddings and then using a ML model such as a deep neural network word embedding. As is known in the art, a deep neural network (DNN) is an artificial neural network with multiple layers between the input and output layers. A DNN can find the correct mathematical manipulation (e.g., linear or non-linear relationship) to turn the input into the output. The DNN can move through the layers and calculate the probability of each output. Each mathematical manipulation in the network is considered a layer. As a result, a complex DNN may have many layers. A DNN can also be used to create embeddings. Creation of embeddings may involve mapping of a discrete—categorical—variable to a vector of continuous numbers. In the context of neural networks, embeddings may be high-dimensional, continuously learned vector representations of discrete variables (e.g., domain names, etc.). Neural network embeddings may be used because they can reduce the dimensionality of categorical variables and meaningfully represent categories in the transformed vector space. As a result, a neural network word embedding mechanism may be used by the training mechanism 118 to convert the data in the data store 1116 to a vector space.

In one implementation, the training data in the data store 116 may be learned continuously or on a predetermined schedule. In an example, learning may include an initial learning that may be done by using an initial data set collected from input gathered from the ISP. This data may be gathered overtime and used in the initial training of the system. After the initial learning is complete, continuous use of the system 100 may enable the ISP 140 to provide incremental learning.

It should be noted that while collecting information for processing and learning, care is taken to ensure compliance with privacy standards and regulations. For example, user information that may be confidential or may reveal a user's identity may be masked. In another example, a user must provide consent for collecting and using their information for learning processes.

In order to properly train a ML model to classify internet domain names, a training dataset may first be created. In one implementation, this may be achieved by collecting Domain Name Server (DNS) query traffic from the ISP over a specific time period. The specific time period may be predetermined and may be set based on specific needs and resources of an ISP. In one example, DNS query traffic is collected over a several day time period (e.g., 7 days). The DNS traffic may be collected from the ISP's core network. The collected dataset may consist of one or more files, where each file may represent data collected over a segment of the total time period. For example, when data is collected over a 7-day time period, each file may represent the data for each day. In an example, each file is a CVS file containing data that represents information about DNS traffic. In one implementation, the data is in the format of timestamp, destination IP address, source IP address, query name, and query type.

FIG. 2 depicts an example data file 200 containing information about DNS traffic data collected from an ISP. In the example data file 200, the data is in the format of multiple rows of data, each row representing one DNS query and containing a timestamp, source IP address, query name, and query type. For example, the first row of the data file 200 starts with the timestamp "Oct. 22, 2018 02:29: 38.680373000." The next entry in the first row which is "202.95.128.180" represents the destination IP address, while the subsequent entry of "10.128.17.185" represents the source IP address. Data provided after the source IP address represents the query name which for the first row is "config-api.internet.apps.samsung.com" and the subsequent entry of "0x0001" represents the query type. In this manner, data that can be used in classifying internet traffic accurately can be collected for training a classification model.

Once data is collected over the designated time period in multiple files, the files may be combined into a single file to form one file based on which a training dataset may be created. In an example, once the files are combined, the resulting file has a total of hundreds of millions of rows, where each row represents one DNS query. The resulting file may be provided to a data cleaning and/or a data wrangling module to remove the types of data that are not useful in creating the training dataset. In one implementation, all queries except for A and AAAA type DNS queries are removed. This is because A and AAAA type DNS queries are the ones that correspond to a host IP address lookup and as such are useful in data traffic classification. Furthermore, to ensure domain names belonging to the same entity are not treated as being different domain names, such domain names in the file may be shortened to a few significant levels (e.g., 2 or 3 significant levels). For example, domain names "images.mydomain.com" and "music.mydomain.com" may both be shortened to "mydomain.com" to remove the heterogeneity between them. While some domain names are being shortened to ensure they are classified properly, care may be taken to ensure country specific domain names are still treated as being different (e.g., yelp.com.us and yelp.com.ca). For example, while "images.mydomain.com" and "music.mydomain.com" are both be shortened to "mydomain.com", "images.mydomain.com.us" is shortened to "mydomain.com.us" to preserve the country specific nature of the domain name. To achieve this, an additional dataset which provides country code top level domain (ccTLD) may be used to help identify domain names (e.g., yelp.com.de) that end in a country specific suffix.

In one implementation, removing unnecessary DNS queries and shortening domain names may result in a significant reduction in the number of rows in the combined DNS data file. For example, the combined file having a starting total of 589 million rows may be reduced to 1.05 million rows containing unique domains. Such removing of unnecessary data may result in more efficient and more accurate training of the ML model(s).

In one implementation, after the data file has been cleaned and unnecessary data removed, the file may be parsed and each line tokenized, such that a new timestamp aggregation field can be generated for identifying domain name queries that originate from the same user. This is because it is often helpful in classifying DNSs to determine the sequence of DNS queries received from the same user, particularly if they are from the same browsing session. However, the IP address assigned to a user may be dynamic and can change with time. For example, after an extended period of inactivity, the IP address for a user may change. As a result, to ensure DNS queries from the same user are identified correctly, a time interval may be selected that is short enough that the IP address assigned to a user is not likely to change during that time period. However, while being short to ensure consistency of IP address, the time period may also be selected such that it is long enough to accumulate a critical mass of domain name queries for the dataset. In an example, the selected time period is one hour. In another example, the selected time interval is one day. In yet another example, a 20-minute interval is selected and found to provide satisfactory results. The chosen time period may then be used as the timestamp aggregation field which can be utilized along with the source IP address as a grouping key to create groups of data from the rows of the data file. After the grouping has been done, the resulting file may group together rows of data that fall within the chosen time period (e.g., a first 20-minute period, a second 20-minute period, etc.) and include the same source IP address. Furthermore, in an example, the query name and/or query type may be removed from the data. This results in a data file containing a plurality of rows of data where each row includes a timestamp, source IP address and a DNS, and rows of data falling within a selected time period and originating from the same IP address are grouped together.

FIG. 3 depicts an example data file 300 containing raw data that was processed as discussed above and a dataset 350 created from the data file 300 for use in generating DNS vectors. As illustrated, the data file 300 includes multiple rows of data where all rows belonging to the time period TS1 are grouped together. Furthermore, from among those rows of data, the ones originating from the source IP address IP1 are grouped together at the top and those originating from the source IP address IP2 are grouped together on the bottom. This raw data may then be used to create a single document that corresponds to DNS lookups occurring within a designated time period from one single IP address. This is depicted in the dataset 350, where each row represents one document. Each document in this dataset may have the format of $T_{interval}$, Source IP address, and various DNSs requested by the Source IP address within the $T_{interval}$. In this manner, the entire data file may be transformed into a corpus of DNS documents that can then be converted into a vector space.

To further ensure that vector embeddings that are generated from the dataset accurately classify DNSs, highly common domain names may be removed from the dataset. These commonly accessed domain names may be referred to as stop-domains and include domain names that occur so frequently in every document that they make it difficult to obtain good quality embeddings. That because domain names that occur frequently make appear to be similar to a lot of domain names because of their frequency.

In one implementation, stop-domains are removed from the documents by using a frequency count-based removal mechanism such as employing a term frequency, inverse document frequency (TF-IDF) score, as is known in the art. In this manner, a TF-IDF score may be calculated for each domain name in the list of domain names within the documents. This approach may be preferable to pure frequency-based mechanisms, as it takes into account frequency of occurrence across documents. Once the TF-IDF score is calculated for all domain names, the domain names may be sorted by their TF-IDF score. Subsequently, a predetermined number of domain names (e.g., 100 domain names) with the lowest TF-IDF scores may be removed from the documents.

FIG. 4 depicts an example list of domain names with their corresponding TF-IDF scores. In an example, these domain names represent the most frequency accessed domain names within a set of documents. As can be seen, these domain names include some of the most frequency used websites. As such, it may not be surprising that they are identified as stop-domains. Because these domain names are frequency accessed by all users, their presence in a sequence of domain name queries may not necessarily indicate a correlation between the domain names. As a result, to ensure they do not eschew the vector space improperly, they may be removed. The resulting dataset may then contain a plurality of documents (e.g., sets of DNS queries from the same IP source within the same time interval) that can be used to train a ML model that converts the domain names to a vector embedding space. To do so, each DNS in the documents may be treated as a word.

Figure 5:
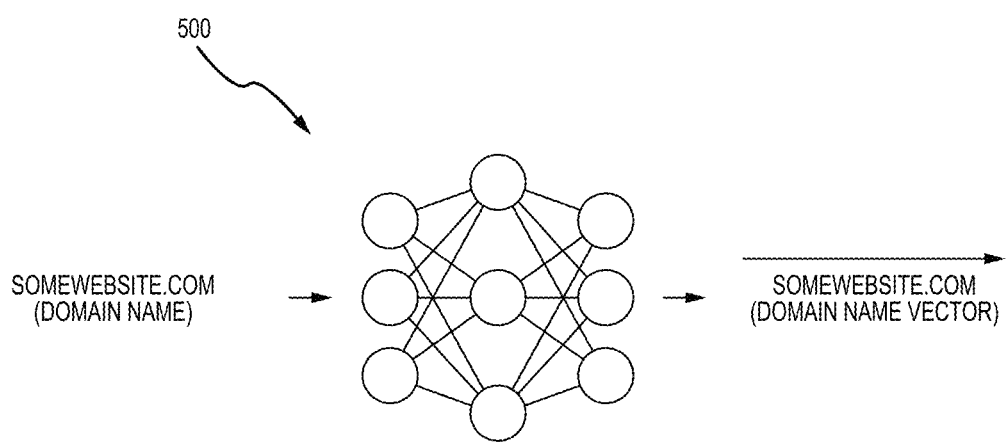
FIG. 5 depicts a simplified diagram for converting a domain name to a domain name vector.

FIG. 5 depicts a simplified diagram for converting a domain name to a domain name vector. The domain names in the training dataset may be used to create embeddings for the domain names. This may be achieved by using a word to vector ML model (e.g., a skipgram word2vec model). Table 1 depicts example set of hyper parameters used for the word to vector ML model to create a DNS vector embedding space.

TABLE 1

| Hyper-parameter | Selected Value | Description |
| --- | --- | --- |
| Vocabulary size | 40,000 | The number of domain names in the dataset for creating the embeddings. |
| Sample | $10^{-5}$ | The threshold for configuring which higher-frequency words are randomly down sampled. |
| Negative Exponent | −1 | The exponent used to shape the negative sampling distribution. A value of 1.0 samples exactly in proportion to the frequencies, 0.0 samples all words equally, while a negative value samples low-frequency words more than high-frequency words. |
| Embedding Size | 128 | The dimensionality of the embedding vector. |
| Window | 7 | Maximum distance between the current and predicted word within a sentence. |
| Negative Samples | 5 | The number of "noise words" that are drawn. Noise words may refer to words that are very dissimilar to the word for which the vector embeddings are being generated. Because the number of dissimilar words are many orders of magnitude more than the number of similar word, to save on computation, negative sample number of dissimilar words may be taken to optimize training time. |
| Training Iterations | 150 | The number of iterations (epochs) over the corpus. |

Figure 6:
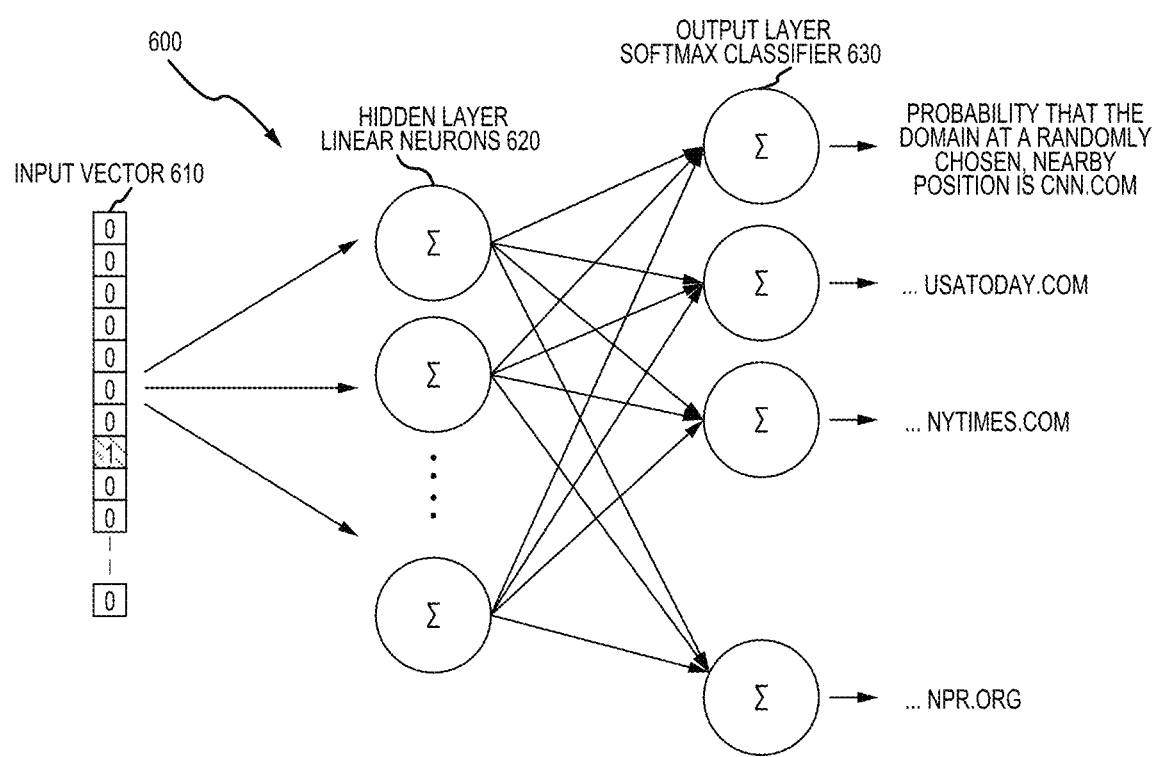
FIG. 6 depicts a simplified neural network architecture for applying a word to vector conversion model to a domain name.

FIG. 6 depicts a simplified neural network architecture 600 for applying a word to vector conversion model to a domain name. The neural network architecture 600 may include a series of input vectors 610 (e.g., the domain names in the training dataset) that is supplied to a hidden layer of linear neurons 620. In one example, the hidden layer 620 includes 128 neurons. The output of the hidden layer 620 may then be supplied to an output layer classifier 630 which in turn provides the probability that a domain name at a randomly chosen nearby position to another domain name (e.g., domain name theatlantic.com) is a particular domain name (e.g., cnn.com, usutoday.com, nytimes.com, npr.org). Thus, the output classifier layer may provide DNS vectors that represent a probabilistic distribution of a relationship between a given domain name and other domain names. In one example, the output layer classifier 630 includes 40,000 neurons. In this manner, entities representing domain names can be converted to a semantic vector space.

Figure 7:
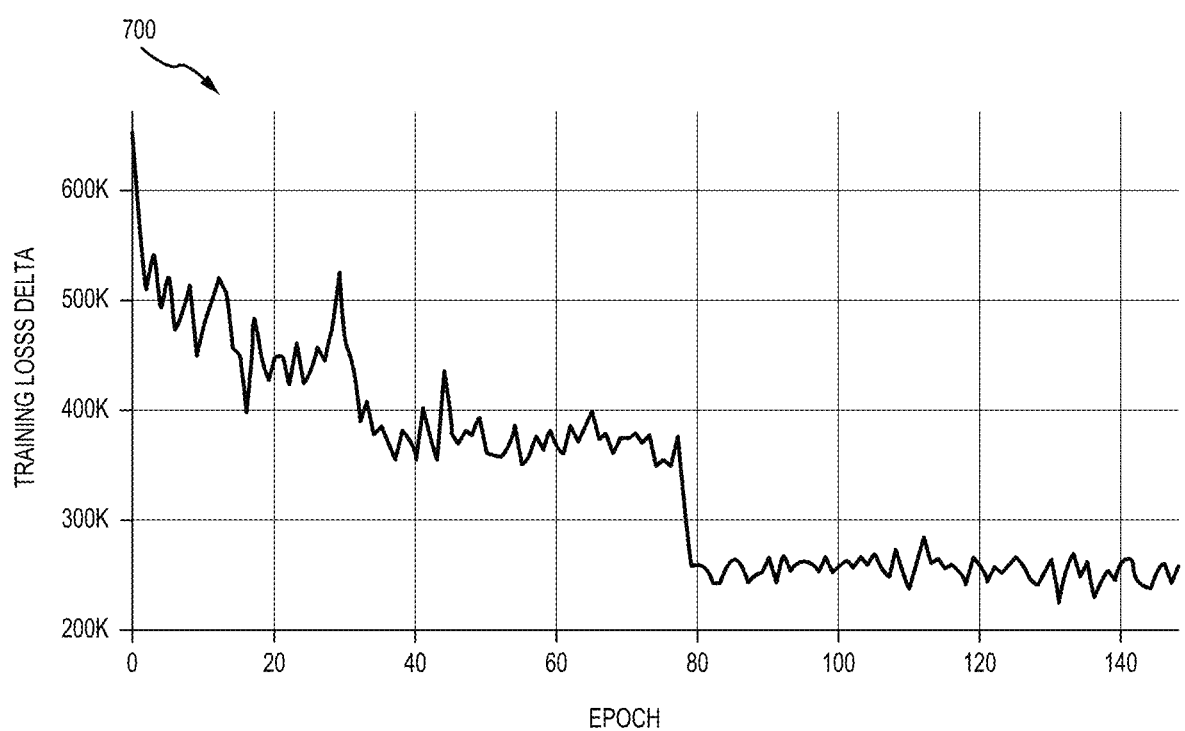
FIG. 7 depicts an example graphical representation of training loss verses the number of epochs for the neural network architecture of FIG. 6.

In one implementation, to improve the quality of the domain vectors, the training process is reiterated a plurality of times. In one example, there are 150 training reiterations (epochs). FIG. 7 depicts an example graphical representation of training loss verses the number of epochs for the neural network architecture of FIG. 6. As is known in the art, training loss represents inaccuracies of a trained model. Thus, the lower the training loss for a model, the better is the model's prediction. As depicted in graph 700, as the number of reiterations increase from 0 to about 80, the training loss decreases consistently. However, from approximately epoch number 80 to epoch number 140, there is no substantial change in the training loss. Examining such a graph 700 may assist in determining the most optimized process of training the model. For example, by examining a graph such as graph 700, the most optimized number of reiterations for training the model may be determined.

Once the model is trained with a determined number of iterations, one or more mechanisms may be used to evaluate the accuracy of the model, before it is used. A first approach for examining the DNS vector space, may involve finding similar domain names for one or more selected common domain names in different categories of domain names (e.g., shopping website, news website, medical website, etc.) using the trained DNS vector space. This may be performed by using a similarity function of the vector space which evaluates vector similarities. In one example, the similarity function is a cosine similarity function that finds similarities between vectors for the domain of interest (i.e., the selected domain name) and the rest of the domains in the dataset (i.e., vocabulary). In an example, a predetermined number of domain names (e.g., 10 domain names) are selected from various categories such as news, business, shopping, and the like. Then, the similarity function of the model is used to identify a set of similar domain names (e.g., 10 domain names) for each of the selected domain names. The identified similar domain names may then be examined (e.g., manually by a user) to determine how many of the identified similar domain names are actually similar to the selected domain names.

A second approach for evaluating the quality of the trained model may involve using a website classifier to categorize the domain names in the dataset (i.e., the vocabulary). This may involve using a known website categorizing service that provides categories for websites. Alternatively, a database may be created that categorizes websites (e.g., domain names in the dataset) into different categories. The categories may include news/media, business, technology, shopping, entertainment, social network, and education, among others. Once all the domain names in the dataset have been categorized, one or more domain names may be selected for evaluation. For each of the selected domain names, a predetermined number of similar domain names (e.g., 3 similar domain names) may be identified using the trained model. Then, the categories of the identified similar domains may be compared against the category of the selected domain name to determine if there is a match between at least one of the identified similar domain names and the domain name of interest for which the similar domain names where identified. If one or more of the similar domain names fall in the same category as the selected domain name, then identified similar domain names may be marked as accurate. Otherwise, the identification may be marked as inaccurate. This process may be repeated for a plurality of domain names in the dataset to determine a percentage of domain names for which accurate predictions are made. In one implementation, the process may be repeated for the entire domain names in the vocabulary. As a result, the fraction of domain names in the dataset for which the prediction is accurate can be calculated. If the calculated fraction indicates that the results is acceptable, then the process may be stopped. Otherwise, an alternate set of hyper parameters may be used to determine how to improve the model.

An alternative approach for evaluating the DNS vector space may involve generating a Distributed Stochastic Neighbor Embedding (t-SNE) visualization of the vectors to determine if domain names belonging to the same category cluster together in the t-SNE visualization. This may involve, plotting vectors corresponding to the domain names in a 2-dimensional space by using t-SNE visualization, and then color coding the results by category to enable visual examination. Once the t-SNE plot is generated, a user may examine the visualization to determine if same category domain names such as search engines, news websites, and the like cluster together.

Once the DNS vector space is created and confirmed to include an acceptable level of accuracy, the results may be utilized in a number of different ways. For example, the generated DNS vector space may be used to categorize new domain names in various categories (e.g., news media, entertainment, online shopping, API, etc.). Furthermore, the DNS vectors may be used in prioritizing internet traffic based on domain name categorization from the start (e.g., from the first packed onwards). Additionally, the DNS vectors may be used as a feature in ML models that identify malicious traffic. In another example, DNS vectors may be used to predict which set of domain names will be requested in a browsing session. Furthermore, DNS vectors may be used from a browsing session to create a browsing session vector. This may be done by examining the domains accessed by a source IP address over a given time period (e.g., 20 minutes, 60 minutes, etc.), determining which ones of the domains have a corresponding vector in the DNS vector space and creating a browsing vector by taking an average of those vectors. Taking an average may include averaging out each dimension individually and then combining the dimensions to get an average vector. In one implementation, the averaging process may involve taking a weighted average such that if a particular domain is accessed a number of times within the given time period, the average takes into account those numbers. The resulting browsing vector presents a numerical representation of browsing data which may not include any user identifying information. As a result, the browsing vector may be used to infer other information. For example, such browsing vectors may be used in training a ML model that predicts other behaviors based on user the browsing data.

Figure 8:
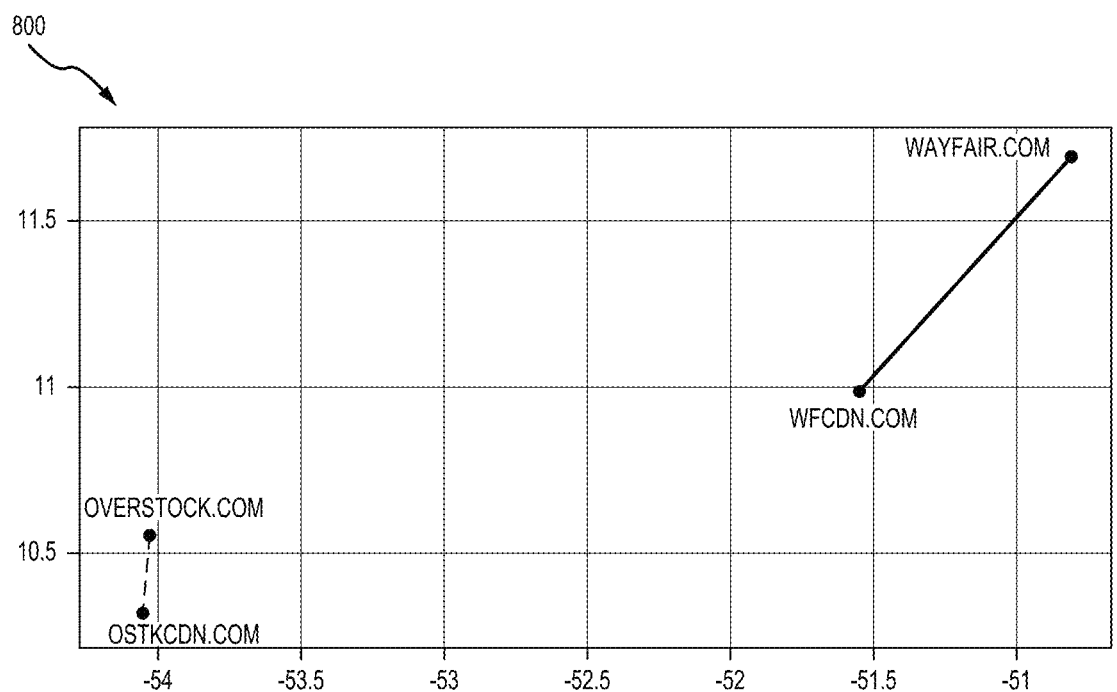
FIG. 8 depicts a graphical representation of analogies between two different sets of domain names.

In one implementation, the DNS vector space may be utilized to perform domain name analogies. FIG. 8 depicts a graphical representation of analogies between two different sets of domain names. As illustrated by graph 800, the relationship between overstock.com and ovtkcdn.com may be used to make a reference between the relationship between wayfair.com and wfcdn.com. That is because ostkcdn.com is identified as the content delivery network for overstock.com. Similar websites may then be examined to determine which website fits in the same category as ostkcdn.com and has a similar relationship with wayfair.com as the relationship between overstock.com and ovtkcdn-.com. In the same manner, relationships between different website may be used to determine what website falls into a category that corresponds to both. For example, delta.com and Hilton.com may be examined to determine the combination of delta.com and Hilton.com is in the same category as tripadvisor.com. That is because the combination of airline category and hotel category may be identified as a vacation planning category.

Figure 9:
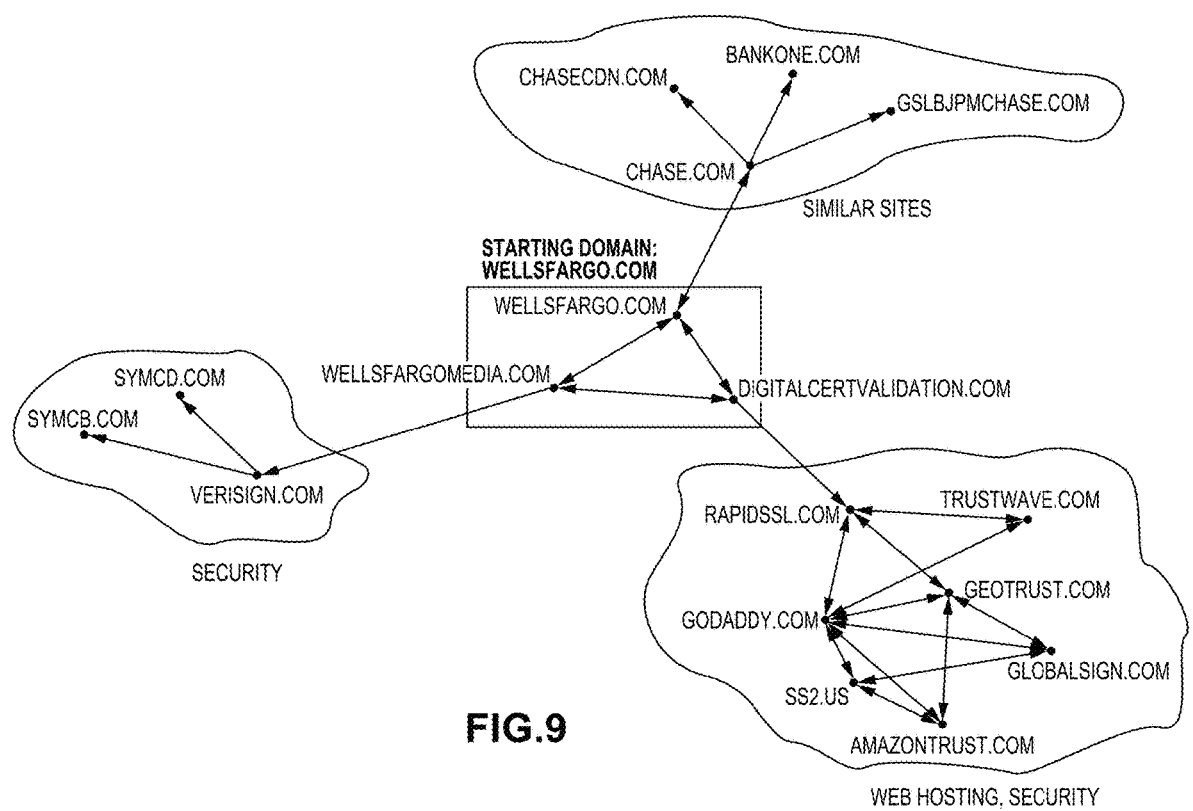
FIG. 9 depicts an example network graph for a selected domain name.

Another manner in which the DNS vector space may be used may include creating a network topology by starting from a domain name which is selected as a seed and linking a specific number of domain names that are most closely associated with the selected domain names to the seed. The process may then be repeated to build a network graph. FIG. 9 depicts an example network graph 900 for a selected domain name. The selected domain name for the graph 900 is wellsfargo.com and the number of most closely associated domain names is selected as three. By recursively discovering three most similar domain names, the network topology can reveal interesting patterns, which may not only include other similar websites (e.g., chase.com), but also domains in different categories such as website security and hosting. Such a graph can be utilized as a source dataset for applying graph analytics to determine which nodes (i.e., domain names) have the highest connectivity and which ones are in between.

Figure 10:
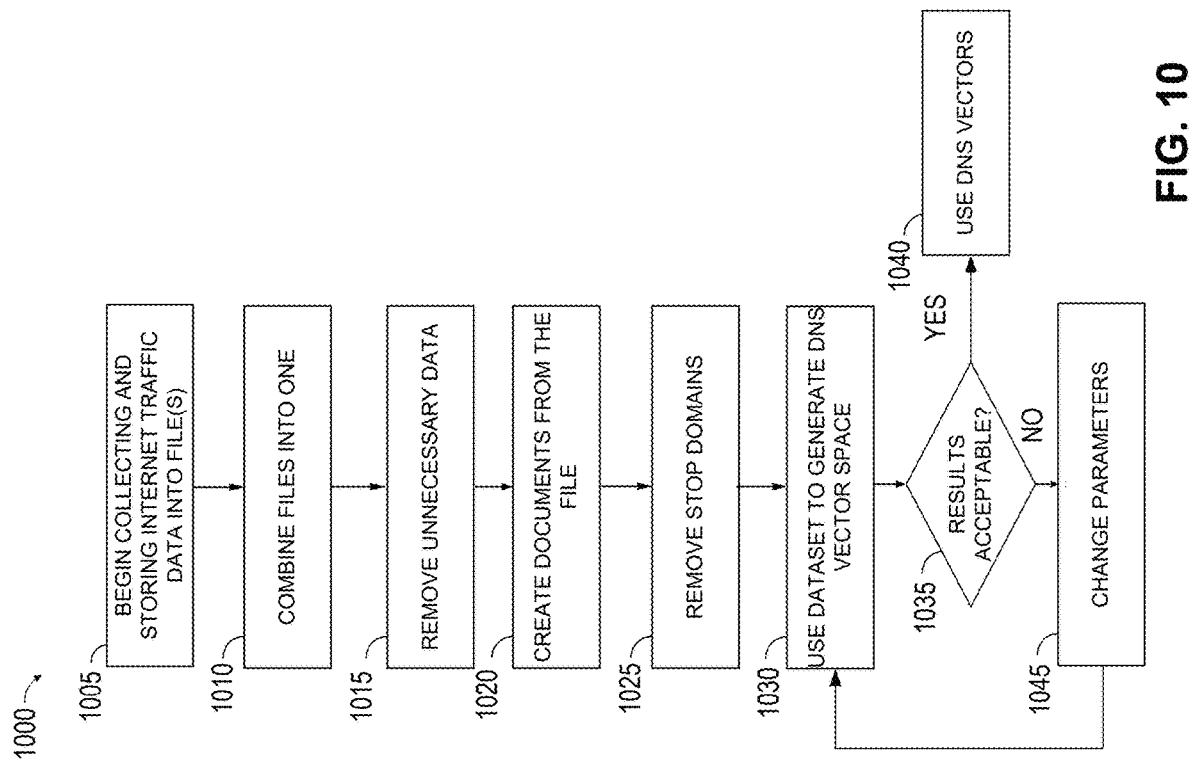
FIG. 10 is a flow diagram depicting an example method for creating a domain name server vector space which can be used in a number of ways to improve network traffic.

FIG. 10 is a flow diagram depicting an example method 1000 for creating a DNS vector space which can be used in a number of ways to improve network traffic. At 1005, method 1000 may begin collecting internet traffic data. This may be achieved by utilizing information from an ISP. In an implementation, as internet traffic flows, an ISP may begin collecting specific data about the network traffic upon receiving a request to do so. The data may include parameters such as a timestamp, source IP address, destination IP address, query name and query type for each query received within a predetermined time period. This may be done, for example, by sending a request to an ISP to begin collecting this data and storing it in a file. The data may be stored in one or more files for each predetermined time interval. The ISP may continue collecting and storing the data until it receives an indication to stop collecting and/or storing the data. Alternatively, the initial request may include the time period (e.g., three days) during which data should be collected.

Once the required data is collected, depending on the number of files generated, the data in the various files may be combined to form one merged file, at 1010. The data in the merged file may then be processed to remove unnecessary and/or repeated domain names, at 1015. This may involve shortening some domain names, as discussed above. It may also include applying a data cleaning and/or a data wrangling module to remove the types of data that are not useful in creating the training dataset. The data in the file may then be sorted based on queries originating from the same source IP address within a predetermined time interval to create documents containing words (e.g., domain names) for each source IP address, at 1020. Domain names that are identified as stop-domains (e.g., most frequently occurring domain names) may then be removed from the documents, at 1025.

The resulting dataset may then be used in a deep neural network containing multiple layers to create a DNS vector space, at 1030. The resulting vector space may then be evaluated using a number of different approaches to determine if the vector space accurately reflects domain name categories and relationships, at 1035. When it is determined, at 1035, that the vector space includes an acceptable level of accuracy, method 1000 may proceed to use the vector space in network traffic optimization and analysis, at 1040.

When, however, it is determined, that the results are not satisfactory, method 1000 may proceed to change some parameters of the dataset and/or training mechanism, at 1045, before repeating the training process, at 1030. The steps of training the model and evaluating it for accuracy may be repeated until an acceptable vector space is generated.

Thus, in different implementations, a technical solution may be provided to generate vector embeddings for representing domain names, where the DNS vectors encode similarity between domain names. To achieve this, the technical solution creates a training dataset that is collected from network traffic over a period of time. The resulting vector space can be used to find complex relationships between domain names that correspond with real world associations. The information can be used to optimize various traffic engineering functions, as by simply using the vector representation of a domain name, the traffic corresponding to the domain name can be categorized. Once categorized, the traffic can be properly prioritized, shaped, filtered or be used to determine an average vector for a browsing session.

Figure 11:
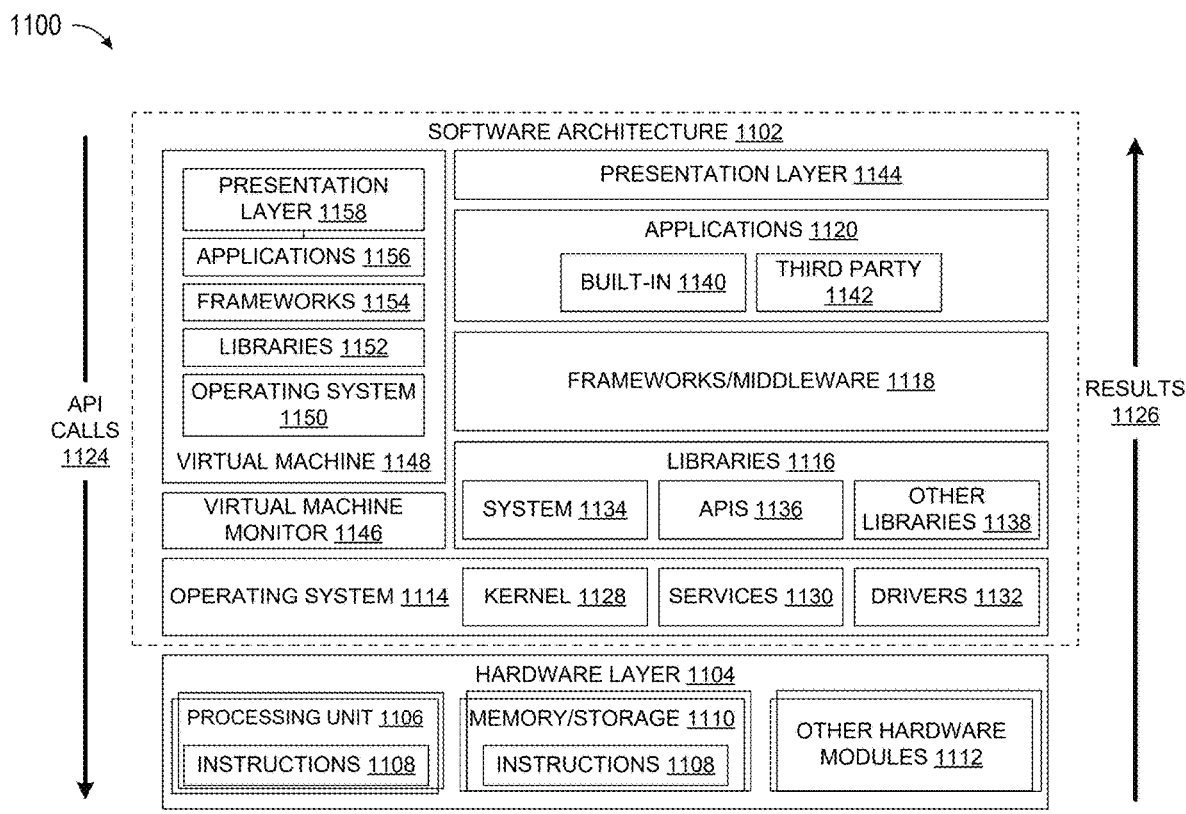
FIG. 11 is a block diagram illustrating an example software architecture, various portions of which may be used in conjunction with various hardware architectures herein described.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware such as client devices, native application provider, web servers, server clusters, external services, and other servers. A representative hardware layer 1104 includes a processing unit 1106 and associated executable instructions 1108. The executable instructions 1108 represent executable instructions of the software architecture 1102, including implementation of the methods, modules and so forth described herein.

The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1124. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1120 and/or third-party applications 1122. Examples of built-in applications 1120 may include, but are not limited to, a contacts application, a browser application, a location application, a media application, a messaging application, and/or a game application. Third-party applications 1122 may include any applications developed by an entity other than the vendor of the particular system. The applications 1120 may use functions available via OS 1114, libraries 1116, frameworks 1118, and presentation layer 1124 to create user interfaces to interact with users.

Some software architectures use virtual machines, as illustrated by a virtual machine 1128. The virtual machine 1128 provides an execution environment where applications/modules can execute as if they were executing on a hardware machine (such as the machine 1200 of FIG. 12, for example). The virtual machine 1128 may be hosted by a host OS (for example, OS 1114) or hypervisor, and may have a virtual machine monitor 1126 which manages operation of the virtual machine 1128 and interoperation with the host operating system. A software architecture, which may be different from software architecture 1102 outside of the virtual machine, executes within the virtual machine 1128 such as an OS 1150, libraries 1152, frameworks 1154, applications 1156, and/or a presentation layer 1158.

Figure 12:
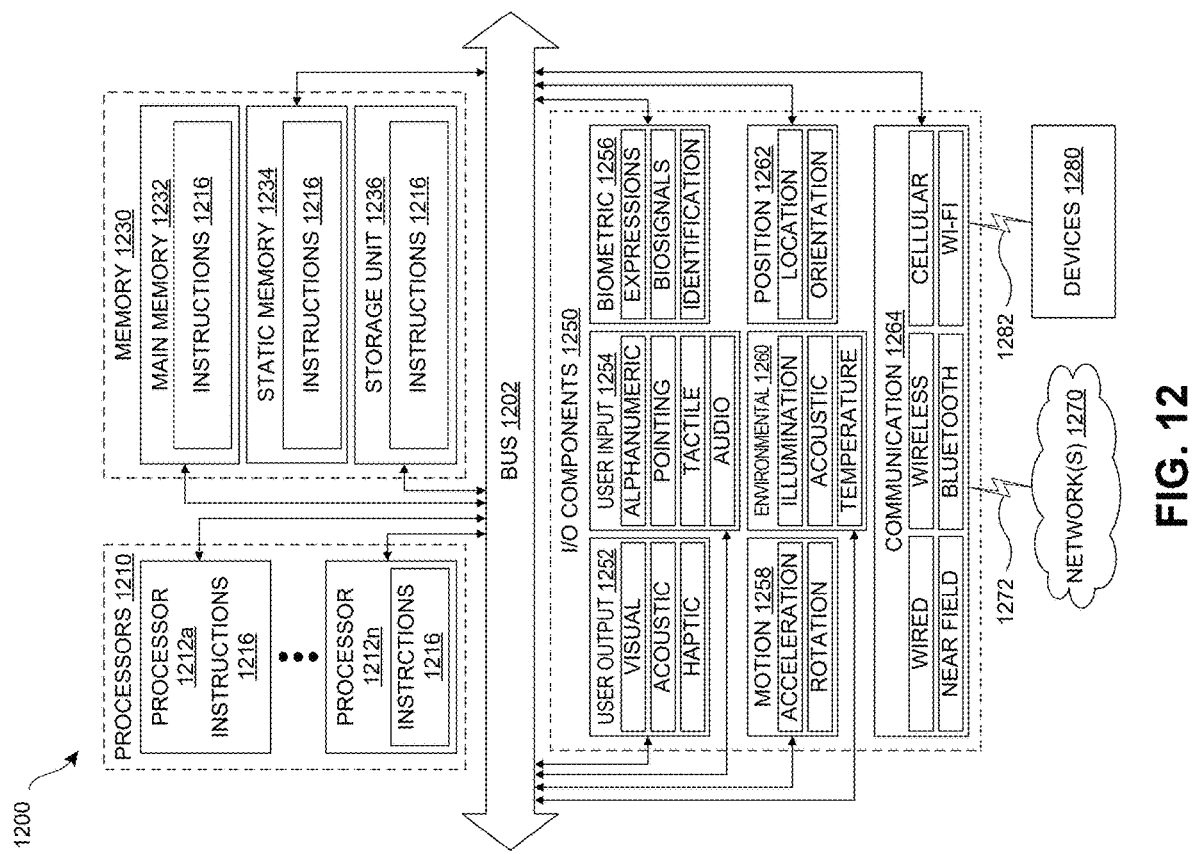
FIG. 12 is a block diagram illustrating components of an example machine configured to read instructions from a machine-readable medium and perform any of the features described herein.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement methods or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" includes a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212a to 1212n that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include biometric components 1256 and/or position components 1262, among a wide array of other environmental sensor components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network (s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-10) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory storing executable instructions that, when executed by the processor, cause the data processing system to perform functions of:
   receiving data relating to internet traffic over a network;
   organizing the data into one or more documents that make up a training dataset, each of the one or more documents including one or more Domain Name Server (DNS) queries;
   using the training dataset to generate at least one vector space embedding for one or more domain names; and
   providing the at least one vector space embedding as an output,
   wherein organizing the data into the one or more documents includes:
   sorting the one or more DNS queries in at least one of the one or more documents based on a frequency of occurrence of each of the one or more DNS queries, and removing a predetermined number of the one or more DNS queries having one or more highest frequencies of occurrence from the at least one of the one or more documents, the predetermined number of the one or more DNS queries representing one or more most frequently queried domain names within the one or more documents.

2. The data processing system of claim 1, wherein the data relating to internet traffic is provided by an internet service provider (ISP).

3. The data processing system of claim 1, wherein the data is in the format of timestamp, destination IP address, source IP address, query name, and query type.

4. The data processing system of claim 2, wherein the query type is used to remove DNS queries having a query type that is not necessary for the training dataset.

5. The data processing system of claim 2, wherein organizing the data into the one or more documents further includes sorting the data based on the timestamp and the source IP address such that each of the one or more documents includes destination IP addresses that originated from one source IP address within a specific time period.

6. The data processing system of claim 1, wherein using the training dataset to generate the at least one vector space embedding includes providing the training dataset to a deep neural network to generate the at least one vector space embedding for the for one or more domain names.

7. The data processing system of claim 1, wherein the output is used in internet traffic engineering operations.

8. A method for converting domain names to a vector space embedding, the method comprising:
receiving data relating to internet traffic over a network;
organizing the data into one or more documents that make up a training dataset, each of the one or more documents including one or more Domain Name Server (DNS) queries;
using the training dataset to generate at least one vector space embedding for one or more domain names; and
providing the at least one vector space embedding as an output,
wherein organizing the data into the one or more documents includes:
sorting the one or more DNS queries in at least one of the one or more documents based on a frequency of occurrence of each of the one or more DNS queries, and
removing a predetermined number of the one or more DNS queries having one or more highest frequencies of occurrence from the at least one of the one or more documents, the predetermined number of the one or more DNS queries representing one or more most frequently queried domain names within the one or more documents.

9. The method of claim 8, wherein the data is in the format of timestamp, destination IP address, source IP address, query name, and query type.

10. The method of claim 9, wherein the query type is used to remove DNS queries having a query type other than an A or an AAAA type DNS query.

11. The method of claim 9, wherein organizing the data into the one or more documents further includes sorting the data based on the timestamp and the source IP address such that each of the one or more document includes destination IP addresses that originated from one source IP address within a specific time period.

12. The method of claim 8, wherein using the training dataset to generate the at least one vector space embedding includes providing the training dataset to a deep neural network to generate the at least one vector space embedding for the for one or more domain names.

13. A non-transitory computer readable medium on which are stored instructions that when executed cause a programmable device to:
receive data relating to internet traffic over a network;
organize the data into one or more documents that make up a training dataset, each of the one or more documents including one or more Domain Name Server (DNS) queries;
using the training dataset to generate at least one vector space embedding for one or more domain name; and
provide the at least one vector space embedding as an output,
wherein organizing the data into the one or more documents includes:
sorting the one or more DNS queries in at least one of the one or more documents based on a frequency of occurrence of each of the one or more DNS queries, and
removing a predetermined number of the one or more DNS queries having one or more highest frequencies of occurrence from the at least one of the one or more documents, the predetermined number of the one or more DNS queries representing one or more most frequently queried accessed domain names within the one or more documents.

14. The non-transitory computer readable medium of claim 13, wherein the data is in the format of timestamp, destination IP address, source IP address, query name, and query type.

15. The non-transitory computer readable medium of claim 13, wherein organizing the data into the one or more documents further includes sorting the data based on the timestamp and the source IP address such that each of the one of more document includes destination IP addresses that originated from one source IP address within a specific time period.

16. The non-transitory computer readable medium of claim 13, wherein the data relating to internet traffic is collected by an ISP over a specific time period.

17. The non-transitory computer readable medium of claim 13, wherein the output is used in internet traffic engineering operations.

18. The data processing system of claim 1, wherein the output is used in categorizing a plurality of domain names into one or more categories, and the one or more categories are used to prioritize internet traffic.

19. The data processing system of claim 1, wherein the executable instructions when executed by the processor, further cause the data processing system to perform functions of evaluating an accuracy of the output.

20. The data processing system of claim 1, wherein using the training dataset to generate the at least one vector space embedding includes:
providing the training dataset as an input to a hidden layer of a deep neural network;
receiving a hidden layer output from the hidden layer;
providing the hidden layer output to an output layer classifier; and
receiving from the output layer classifier the at least one vector space embedding.

* * * * *